United States Patent Office 3,057,779
Patented Oct. 9, 1962

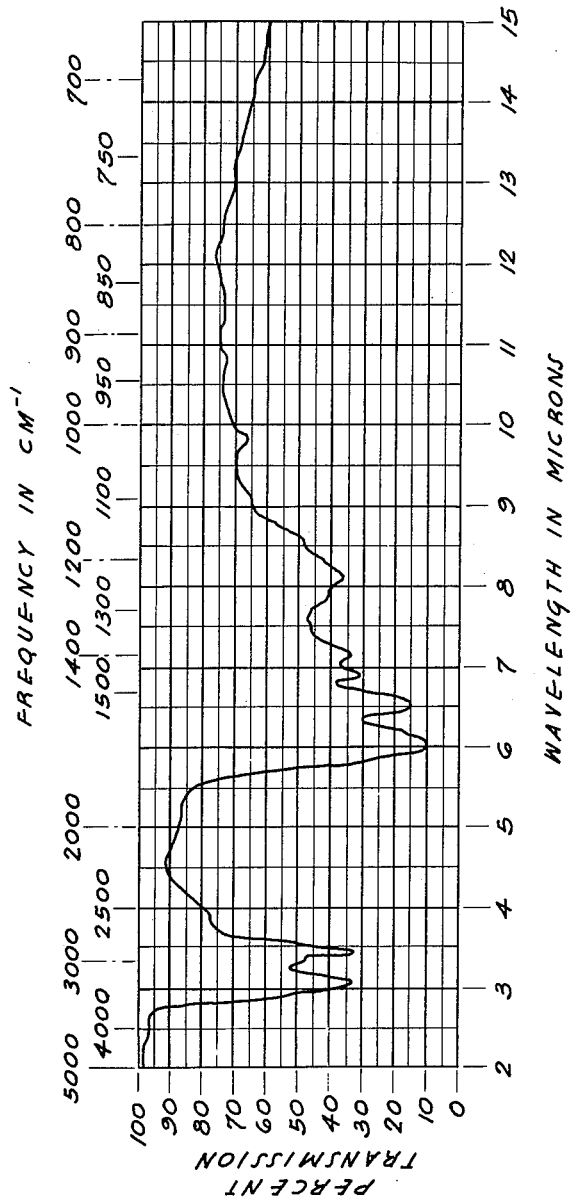
INVENTORS.
ANTHONY JOSEPH SHAY
JAMES ALFRED LOWERY
NESTER BOHONOS
EDWARD JAMES BACKUS
ATTORNEY.

3,057,779
ANTIBIOTIC AND PRODUCTION THEREOF
Anthony Joseph Shay, Pearl River, James Alfred Lowery, New City, Nestor Bohonos, Nanuet, and Edward James Backus, Pearl River, N.Y., assignors to American Cyanamid Company, New York, N.Y., a corporation of Maine
Filed Mar. 14, 1960, Ser. No. 14,990
7 Claims. (Cl. 167—65)

This invention relates to a new antibiotic and to its production by fermentation, to methods for its recovery and concentration from crude solutions, to processes for its purification and to methods for the preparation of its salts.

The present invention includes within its scope the antibiotic in dilute forms, as crude concentrates, and in pure crystalline forms. These novel products are active against a variety of microorganisms including gram-positive bacteria. The effects of the new antibiotic on specific microorganisms together with the chemical and physical properties of the antibiotic differentiate it from previously described antibiotics.

The new antibiotic called aspartocin (formerly designated A-8999) is formed during the cultivation under controlled conditions by the microorganisms *Streptomyces griseus* var. *spiralis* and *Streptomyces violaceus* var. *aspartocinicus*. The following is a general description of the organism *Streptomyces griseus* var. *spiralis* based on the diagnostic characteristics observed. The underscored descriptive colors are those of Ridgway, "Color Standards and Color Nomenclature."

Amount of growth: Growth moderate to good on many media, spreading on starch-containing media; poorer, restricted growth on certain synthetic media.

Aerial mycelium and/or spore color: Spores en masse are Pale Olive-Buff; non-sporing aerial mycelium colorless to whitish.

Soluble pigments: None.

Reverse color: In shades of buff to yellowish on most media.

Miscellaneous physiological reactions: No growth on cellulose; complete liquefaction of gelatin; formation of acid curd and clearing of purple milk; and negative $H_2S$ reaction on peptone-iron agar media.

Morphology: Sporiferous appendages arise from aerial mycelium as coils of a few turns or short spirals. Spores elongate, rod-like, truncate ($1.0-1.2\mu \times 0.6\mu$), spaced regularly apart in chains, smooth walled.

Temperature effect: Optimal range for growth and sporulation 18° C. to 37° C. Maximum temperature for growth 42° C., no growth at 48° C. Minimum temperature 10° C., no growth at 4° C.

The cultural characteristics of the new variety of *S. griseus* are set forth in the following table. The underscored descriptive colors were taken from Ridgway.

TABLE 1
Streptomyces Griseus *var.* Spiralis

| Medium | Amount of growth | Aerial mycelium and spore color | Soluble pigment | Reverse color | Remarks |
|---|---|---|---|---|---|
| Waksman's starch agar | Good; spreading | Pale Olive-Buff; sporulation heavy | None | Deep Colonial Buff | Moderate starch hydrolysis. |
| Asparagine dextrose meat extract agar. | Moderate | Pale Olive-Buff; sporulation moderate. | do | Colonial Buff | Limited colorless exudate. |
| Acid asparagine dextrose meat extract agar. | Moderate restricted | Pale Olive-Buff; sporulation very slight. | do | do | |
| Synthetic agar (Czapek's agar) | Thin; restricted | White powdery aerial mycelium; feathery margins. | do | White | |
| Emerson's agar | Moderate | Pale Olive-Buff; sporulation light; colonies lightly rimose. | do | Colonial Buff | |
| Nutrient agar | Poor, thin growth | None | do | Colorless | |
| Calcium malate agar | Moderate; restricted | Pale Olive-Buff; sporulation light | | | Moderate zone of malate clearing. |
| Cobalt amidex agar | Good; spreading | Olive-Buff to Pale Olive-Buff; sporulation heavy. | do | Honey Yellow | Lightly zonate. |
| Potato dextrose agar | Moderate | Pale Olive-Buff; sporulation moderate. | do | Colonial Buff | |
| Bennett's agar | do | Pale Olive-Buff; sporulation heavy | do | Honey Yellow | Limited colorless exudate. |
| Corn steep liquor agar | do | Pale Olive-Buff; sporulation moderate. | do | Cream Color | |
| Sabouraud's maltose | do | Aerial mycelium white; no sporulation; central colony zones barren. | do | Ochraceous-Buff | |
| Yeast-malt agar | do | Pale Olive-Buff; sporulation heavy | do | do | Moderate colorless exudate. |

In gross appearances this new strain bears close resemblance to several strains of S. griseus. Spore coloration, reverse colors and growth habits are similar. However, when the sporophores are compared microscopically, all of the *S. griseus* strains have straight to flexuous chains of globose to eliptical spores, in contrast to the coiled and spiralled chains of truncate, rod-like spores of the new strain. The combination of helicoidal sporophores and bacillary-type spores justifies varietal status for this strain in the *S. griseus* complex. The name *S. griseus* var. *spiralis* has been chosen to be descriptive of the sporiferous structures of the organism. The new isolate, when keyed according to Waksman and Lachevalier, "Actinomycets and Their Antibiotics," falls into subdivision III—no soluble pigment in organic media—and fits best into the category (g)—growth colorless to yellowish to olive-buff—in which *S. griseus* is the representative species.

The following is a general description of the organism *Streptomyces violaceus* var. *aspartocinicus* based on the diagnostic characteristics observed. The underscore descriptive colors were taken from Ridgway.

Amount of growth: Moderate to good growth on most media; spreading on Waksman's Starch, Czapek's, Corn Steep Liquor, and Cobalt-amidex agars.

Aerial mycelium and/or spore color: Spores en masse Light Mouse Gray on most media which support sporulation.

Soluble pigment: In reddish to vinaceous to bluish shades on media which permit pigment formation.

Reverse color: In reddish to vinaceous to bluish or even brownish shades, depending upon the medium.

Miscellaneous physiological reactions: Moderate starch hydrolysis; no $H_2S$ produced; moderate gelatin liquefaction; cellulose decomposed.

Morphology: Sporiferous appendanges arising as coils or loose spirals from aerial hyphae. Spores smooth, typically globose, but with occasional elliptical ones in chain, 1.0–1.2μ.

Temperature relations: Growth fair at 24–28° C.; good at 32–37° C.

The cultural, physiological and morphological characteristics of the organism *Streptomyces violaceus* var. *aspartocinicus* are set forth in the following tables. The underscored descriptive colors were taken from Ridgway.

TABLE 2

*Characteristics of* Streptomyces violaceus *var.* aspartocinicus *When Grown on Several Differential Agar Media in Petri Dishes*

| Medium | Amount of growth | Aerial mycelium and spore color | Soluble pigment | Reverse color | Remarks |
| --- | --- | --- | --- | --- | --- |
| Waksman's starch agar | Good; spreading broadly. | Spores Light Mouse Gray; dark non-sporing sectors prominent; sporulation moderate | None | Dusky Drab | Moderate Starch hydrolysis. |
| Asparagine dextrose meat extract agar. | Moderate | Spores Light Mouse Gray; sporulation thin. | ----do---- | Light brownish with Vinaceous-Gray patches. | Faintly zonate; margins thin, submerged. |
| Acid asparagine dextrose meat extract agar. | Poor; restricted | None | ----do---- | Colorless | |
| Synthetic agar (Czapek's agar). | Good; spreading | Spores Light Mouse Gray; moderate sporulation with sectoring. | Bluish-purple; moderate. | Anthracene purple | |
| Emerson's agar | Good | Spores Light Mouse Gray; sporulation heavy. | Reddish; very light. | Deep Mouse Gray | |
| Nutrient agar | Moderate | Trace of whitish to grayish aerial growth. | None | Colorless to brownish. | |
| Calcium malate | ----do---- | Very poor sporulation; aerial growth Pale Mouse Gray. | ----do---- | Vinaceous-Fawn | Large zone of malate clearing. |
| Yeast extract–malt extract agar. | ----do---- | Spores Light Mouse Gray; sporulation moderate. | ----do---- | Fuscous to Bone Brown. | Thin submerged margins. |
| Waksman's glucose agar | ----do---- | Spores Pale Mouse Gray; sporulation light. | Vinaceous moderate. | Deep Brownish Drab. | Marginal zones wrinkled and without aerial growth. |
| Krainsky's dextrose agar | ----do---- | Spores Pale Mouse Gray; sporulation very light. | None | Pinkish Buff to Fawn color. | |
| Potato dextrose agar | ----do---- | Aerial growth scanty; sporulation Light Mouse Gray, sparse. | Pinkish-vinaceous light | Vinaceous-Slate to Deep Slaty Brown. | Thin submerged margins. |
| Bennett's agar | Good | Spores Light Mouse Gray; sporulation moderate. | None | Deep Mouse Gray | Do. |
| Corn steep liquor agar | Moderate; thin spreading. | Sporulation Light Mouse Gray to Light Drab; sporulation moderate. | ----do---- | Fawn color | Do. |
| Sabouraud's maltose agar | Good | Spores Light Mouse Gray; sporulation moderate. | ----do---- | Orange cinnamon | |
| Cobalt-amidex agar | Moderate; spreading | Light Mouse Gray | Reddish; light | Vinaceous-Slate to Deep Slaty Brown. | Margins thin, submerged. |
| Czapek's-Dox Mannitol agar | Good; spreading | Aerial mycelium white with spores Pale Mouse Gray; sporulation moderate. | Vinaceous; light | Vinaceous-Slate | |

TABLE 3

*Observations of Some Miscellaneous Physiological Tests on* Streptomyces Violaceus *Var.* Aspartocinicus

| Medium | Amount of growth | Aerial mycelium and spore color | Soluble pigment | Reverse color | Remarks |
|---|---|---|---|---|---|
| Peptone-iron agar | Good | | | | Negative H₂S reaction. |
| Gelatin | Moderate | None | None | | Moderate liquefaction; part of tube not liquified. |
| Potato plugs | Good; covering entire exposed surface. | Light Mouse Gray in sporulating areas. | Reddish; light | | Plug slightly darkened. |
| Carrot plugs | Moderate; covering entire exposed surface. | ---do--- | None | | |
| Litmus milk | Moderate | Clearing of purple milk, and curd precipitated; pH 7.0. | | | |
| Cellulose [1] (filter paper in Czapek's solution). | ---do--- | None | Vinaceous; light | | Filter paper decomposed in growth areas. |

[1] Incubation 21 days.

TABLE 4

*Morphological Features of* Streptomyces Violaceus *Var.* Aspartocinicus

[Medium: Waksman's Starch agar]

| Culture No. | Aerial mycelium | Spore shape | Spore size, μ | Remarks |
|---|---|---|---|---|
| Streptomyces violaceus var. aspartocinicus | Sporiferous appendages arising as coils or loose spirals from aerial hyphae. | Typically globose, but with occasional elliptical spore in chains. | 1.0–1.2 | Spores, when viewed under the electron microscope, had smooth walls. |

Viable cultures of *Streptomyces griseus* var. *spiralis* and *Streptomyces violaceus* var. *aspartocinicus* have been deposited with the American Type Culture Collection in Washington, D.C., where they have been assigned ATCC accession numbers 13733 and 13734, respectively.

It is to be understood that for the production of the antibiotic of this invention, the present invention is not limited to the above organisms or to organisms fully answering the above growth and microscopic characteristics which are given for illustrative purposes. In fact, it is desired and intended to include the use of mutants produced from the described organisms by various means, such as X-radiation, ultraviolet radiation, nitrogen mustard, phage exposure and the like.

The cultivation of the organisms *S. griseus* var. *spiralis* and *S. violaceus* var. *aspartocinicus* may take place in a variety of liquid culture media. Media which are useful for the production of the novel antibiotic include an assimilable source of carbon such as starch, sugar, molasses, glycerol, etc., an assimilable source of nitrogen such as protein, protein hydrolysate, polypepetides, amino acids, corn steep liquor, etc., and inorganic anions and cations, such as potassium, sodium, calcium, sulfate, phosphate, chloride, etc. Trace elements such as boron, molybdenum, copper, etc., are supplied as needed in the form of impurities by other constituents of the media. Aeration in tanks and bottles is provided by forcing sterile air through or onto the surface of the fermenting medium. Further agitation is provided in tanks by a mechanical impeller. An antifoaming agent such as 1% octadecanol in lard oil may be added as needed.

For the shaker flask fermentations, 100 milliliter portions of the following liquid inoculum in 500 milliliter flasks are inoculated with an agar slant of the culture.

Liquid inoculum:               Grams per liter
    Soybean meal _____ 20
    Starch _____ 20
    Corn steep liquor _____ 5
    Calcium carbonate _____ 3

The flasks are incubated on a reciprocating shaker and agitated vigorously for 48 hours.

For the production of the antibiotic in tank fermenters, the following fermentation medium is preferably used.

Fermentation medium:           Grams per liter
    Molasses _____ 20
    Corn starch _____ 10
    Bactopeptone _____ 10
    Calcium carbonate _____ 1

Each tank is inoculated with 1% of a culture broth fermented as described above for shaker flask fermentation. Aeration is supplied at the rate of 0.2–2.0 volumes of sterile air per volume of broth per minute and the broth is agitated by an impeller driven at about 120–160 r.p.m. The temperature is maintained at 20–35° C., usually at 28° C. The fermentation may be continued for from 24–240 hours at which time the activity is harvested.

After the fermentation is completed, the culture broth containing the antibiotic of this invention is preferably filtered at pH 5.0 to remove the mycelium from the broth. Diatomaceous earth or any of the conventional filtration aids may be used to assist the filtration which is carried out using standard equipment. Thereafter, the antibiotic may be recovered from the mycelial cake by appropriate extraction procedures.

The antibiotic of this invention may be extracted from the filter cake with water at pH 1–2 or 9–10 and back extracted into an immiscible solvent such as butanol at pH 1–3. Roughly, 80–90% of the activity is contained in the filter cake.

When the butanol solution is concentrated (1/25 to 1/50 its volume) to anhydrous butanol, the antibiotic is precipitated. The butanol-precipitate mixture is stirred with acetone or petroleum ether and the precipitate removed by centrifugation. The antibiotic is then washed with acetone, and dried yielding an amorphous product.

Alternatively, calcium chloride or other salts may be added at this stage of the operation or earlier if desired to facilitate precipitation and/or crystallization.

Purification of the antibiotic may be obtained by crystallization of the calcium salt from solvent mixtures such as butanol-water or methanol-water in a standard manner.

The novel antibiotic of this invention is composed of the elements carbon, hydrogen, nitrogen, sulphur and oxygen. Elemental analyses show values in substantially the following proportions by weight:

| | |
|---|---|
| Carbon | 53.58 |
| Hydrogen | 7.58 |
| Nitrogen | 13.58 |
| Sulphur | 0.36 |
| Oxygen (by difference) | 24.90 |

The product has an optical rotation of $[\alpha]_D^{25°} = +26.4°$ (c., 2.1% solution in methanol). The product shows no characteristic ultraviolet absorption. The product is soluble in water below pH 3.0 and above pH 3.6. The isoelectric point is near 3.3. The free acid is soluble in methanol, ethanol, butanol, glacial acetic acid, water and wet butanol. It is soluble to the extent of 0.6 mg./ml. in acetone and 0.1 mg./ml. in ethyl acetate and ether.

An infrared absorption spectrum of the free acid was prepared in a standard manner by mixing with crystals of KBr and pressing into a disc. The compound exhibits characteristic absorption in the infrared region of the spectrum at the following wavelengths expressed in microns: 3.07, 3.45, 6.03, 6.53, 6.89, 7.15, 8.10 and 9.82. The infrared curve is shown in the accompanying drawing.

Microbiological and paper chromatographic analyses of acid hydrolysates indicate the following amino acid contents:

| | Percent | Molar ratio |
|---|---|---|
| L-Asparatic acid | 35 | 4 |
| L-proline | 8 | 1 |
| L-valine | 8 | 1 |
| Glycine | 10 | 2 |

Three other ninhydrin positive components have been identified as D-α-pipecolic acid, α[L]-β-methylasparatic acid and α,β-diaminobutyric acid.

The antibiotic shows the following $R_f$ values in the solvent systems indicated below:

| $R_f$ Value | Solvent system |
|---|---|
| 0.25 | 5% NH$_4$Cl. |
| 0.38 | s-Collidine saturated with water. |
| 0.14 | 0.2 M phosphate pH 6.0. |
| 0.01 | 100 n-amyl acetate. 30 dibutyl ether. 5 acetic acid. 50 water. |
| 0.90 | 100 chloroform. 35 90% phenol. 4 acetic acid. 2 pyridine. 50 water. |
| 0.01 | 200 benzene. 100 cyclohexane. 15 acetic acid. 50 water. |
| 0.95 | 200 m-cresol. 1 HOAc. 1 pyridine. 100 water. |
| 0.05 | 200 n-butanol. 50 pyridine. 200 water. |
| 0.30 | 200 m-cresol. 100 0.1 M phosphate pH 7.0. 5% NaCl. |
| 0.48 | 200 m-cresol. 100 0.1 M phosphate pH 6.0. |
| 0.80 | 200 n-butanol. 50 pyridine. 50 acetic acid. 100 water. |
| 0.01 | Water adjusted to pH 2.3 with tartaric acid. |
| 0.01 | 200 n-butanol. 100% NaHCO$_3$. |
| 0.01 | 100 1,2-dichloroethane. 100 carbon tetrachloride. 25 acetic acid. 50 water. |
| 0.01 | 100 CHCl$_3$. 40 pyridine. 40 HOAc. 50 water |
| 0.97 | 200 90% phenol. 50 m-cresol. 8 HOAc. 8 pyridine. 50 water. |

The novel antibiotic is clearly distinguished from other antibiotics by its chemical and physical properties described above, by its antimicrobial spectrum and by paper chromatography.

Although aspartocin has chemical and biological properties similar to amphomycin, the two antibiotics can be readily separated by paper chromatography or paper electrophoresis. Individual and mixed spots of aspartocin and amphomycin are subjected to descending paper chromatography with 5 percent NH$_4$Cl solution as development of the paper chromatogram is terminated after 6-7 hours. This is approximately double the time necessary for the solvent to descend to the bottom of the paper strip. Bioautography indicates that aspartocin moves approximately one inch, whereas amphomycin travels six to seven inches. Zone electrophoresis on paper wetted with 5 percent acetic acid shows that amphomycin has approximately six times the mobility of aspartocin towards the cathode.

The antibacterial spectrum of the antibiotic of this invention was determined by the serial broth dilution assay technique and is presented in the table below which shows the minimal inhibitory concentration required to inhibit the growth of representative microorganisms in trypticase soy broth:

TABLE 5

| Organism: | Minimal inhibitory concentration, mcg./ml. |
|---|---|
| Staphylococcus aureus ATCC 65-38 | 15.5 |
| Staphylococcus aureus 209P | 15.5 |
| Streptococcus pyogenes C-203 | 2.0 |
| Streptococcus pyogenes NY-5 | 4.0 |
| Corynebacterium xerosis NRRL B-1397 | 1.0 |
| Bacillus cereus | 4.0 |
| Sarcina lutea | 2.0 |
| Bacillus polymyxa | 4.0 |
| Bacillus megatherium | 0.25 |
| Erysipelothrix rhusophathiae | 0.5 |
| Bacillus subtilis ATCC 6633 | 4.0 |
| Klebsiella pneumoniae | >250 |
| Pasteurella multocida | >250 |
| Salmonella gallinarum | >250 |
| Escherichia coli | >250 |
| Proteus vulgaris | >250 |
| Candida albicans | >250 |
| Mycobacterium ranae | 62.0 |
| Mycobacterium 607 | 62.0 |

The new antibiotic is highly active in vitro against Staphylococci tested including *S. aureus* and *S. albus*, coagulase positives and negatives. Streptococci including α-hemolytic, β-hemolytic and non-hemolytic strains are sensitive to the new antibiotic. Many of the above-mentioned organisms are isolates obtained from clinical sources and are to some extent resistant to either penicillin or the tetracycline antibiotics. The antibiotic is also highly active intraperitoneally and subcutaneously against three standardized infections in mice, Streptococcus C-203, Diplococcus pneumoniae SV1 and Staphylococcus aureus.

Aspartocin has also been found to be substantive to cloth such as cotton fabric and may be added to cotton cloth for the purpose of rendering the cloth bacteriostatic in substantially the same manner as has been found useful with the antibiotic neomycin.

The novel antibiotic of this invention is especially valuable because of its growth-promoting effects in fowl, i.e., chickens and in baby pigs and swine. The antibiotic may be added to a purified chick diet containing casein as the protein source and sucrose as the carbohydrate source supplied with all of the known vitamins and minerals. It has been found that the antibiotic may be usefully added to such diets in amounts as little as 5 or 10 parts per million per kilogram of diet. More may be added if desired but so far no need has been found for adding more than 500 milligrams per kilogram of diet. The percent increase in weight of the chickens over the controls ranges from about 25% to 30%. The antibiotic has been found to produce significant increases in rate of gain in baby pigs when added in the ratio of 10-30 grams per ton of feed comparable to that of the effects obtained with chlortetracycline.

Aspartocin has not as yet been demonstrated to be useful in human therapy.

The invention will be described in greater detail in conjunction with the following specific examples.

EXAMPLE 1

*Inoculum Preparation*

A typical medium used to grow the primary inoculum is prepared according to the following formula:

| | Grams |
|---|---|
| Soy bean meal | 20 |
| Starch | 20 |
| Corn steep liquor | 5 |
| Calcium carbonate | 3 |

Water to 1,000 mililiters.

A yeast-malt agar slant of a culture of the species *S. griseus* var. *spiralis* is incubated for a week. At this time the spores and mycelium are transferred to two 500 milliliter flasks which contain 100 mililiters of the above medium. The flasks are placed on a reciprocating shaker and agitated vigorously for 48 hours at 28° C. The flask inocula are transferred to 9 liter bottles which contain 6 liters of the above liquid medium. These bottles are aerated for 24 hours to encourage further growth. At the end of this time the 9 liter bottles are used to seed fermentor tanks.

EXAMPLE 2

*Fermentation*

A fermentation medium is prepared according to the following formula:

| | Grams |
|---|---|
| Molasses | 20 |
| Corn starch | 10 |
| Bactopeptone | 10 |
| Calcium carbonate | 1 |

Water to 1,000 mililiters.

The fermentation medium is sterilized at 120° C. with steam at 15 pounds pressure for 60 minutes. The pH of the medium before and after sterilization is 6.75. 1500 liters of the sterile medium in 1000 gallon fermentors are inoculated with 12 liters of the bottle inoculum described above and the fermentation is carried out at 28° C. for 90 hours. The medium is agitated by an impeller operating at 100 revolutions per minute. At the end of the fermentation the mash is assayed.

EXAMPLE 3

*Isolation*

Two hundred liters of fermented mash are mixed with 6000 grams of diatomaceous earth, adjusted to pH 5.0, filtered and the filtrate discarded. The mash cake is washed twice—first with 40 liters of $H_2O$ at pH 5.0 and then with 40 liters of acetone. Both washes are discarded. The mash cake is extracted twice with 50 liters of $H_2O$ at pH 2.0 adjusted with $H_2SO_4$, and once with 45 liters of $H_2O$ at pH 9.5 adjusted with NaOH. The acid $H_2O$ and alkaline $H_2O$ extracts are each extracted with ½ volume of n-butanol at pH 2-3. The separated butanol extracts are adjusted to pH 5-6 and concentrated to $\frac{1}{25}$ to $\frac{1}{50}$ of their volume causing the antibiotic to precipitate. The butanol concentrate of the acid $H_2O$ extract is stirred with three volumes of acetone, and the precipitate removed by centrifugation, washed with acetone and dried. The yield of product is 151 grams. The butanol concentrate of the alkaline $H_2O$ is stirred with three volumes of petroleum ether, the precipitate centrifuged off, washed with acetone and dried. The yield of product is 41 grams.

EXAMPLE 4

*Isolation of the Calcium Salt*

Ten grams of calcium chloride and 300 grams of diatomaceous earth are added to 10 liters of fermented mash. The mixture is stirred, adjusted to pH 5.0 and maintained at this pH for 10 minutes during stirring. The precipitated calcium salt is filtered off with the mash cake and the spent filtrate discarded. The mash cake is washed by stirring in 2 liters of $H_2O$ at pH 5.0. After filtration, the inactive $H_2O$ wash is discarded. The mash cake is further washed by stirring with 2 liters of acetone. The mash cake is filtered and the inactive acetone wash discarded. The mash cake is extracted twice by stirring 10 minutes with 2 liters of $H_2O$ at pH 1.0 adjusted with HCl. The antibiotic enriched acid $H_2O$ is extracted with ½ volume of n-butanol. The butanol extract is adjusted to pH 5.0 and concentrated under reduced pressure with the addition of $H_2O$ to maintain a wet butanol solution. The solution is concentrated to approximately 500 milliliters and a wet butanolic solution of $CaCl_2$ is added at pH 5.0 until there is no further precipitation. The precipitated calcium salt is removed by centrifugation, washed with wet butanol, followed by an acetone wash and dried. The yield of crude crystalline product is 6 grams. This product assays approximately 90% pure.

EXAMPLE 5

*Crystallization of the Calcium Salt*

Forty grams of product prepared according to the procedure of Example 3, is dissolved in 200 milliliters of $H_2O$. An aqueous solution of 40 grams of $CaCl_2$ is added and the solution adjusted to pH 9.0 with NaOH and filtered. The filtered solution is readjusted to pH 5.0 with HCl and the precipitated calcium salt is removed by centrifugation. The precepitate is dissolved in 400 milliliters of $H_2O$ at pH 2.5 and 200 milliliters of methanol added. The solution is filtered and the methanol-$H_2O$ solution adjusted to pH 5.0 and stored at 5° C. The crystalline calcium salt is removed by centrifugation. The crystalline product is dissolved in 200 milliliters of methanol at pH 3.0 adjusted with HCl. The solution is stirred with 4 grams of carbon and filtered. The filtered solution is adjusted to pH 5.0 using $NH_2OH$. An immediate crystalline precipitate is formed which is removed by filtration washed with methanol and dried. The first crop of crystalline calcium salt yields 3.85 grams. The mother liquor of the first crop of crystals is stored at 5° C. for 16 hours. A second crop of crystalline calcium salt is removed by filtration, washed with methanol and acetone and dried. The second crop yields 3.37 grams. Additional crops are recovered by concentrating the mother liquor under reduced pressure and storing at 5° C.

EXAMPLE 6

Preparation of the Free Acid of Aspartocin

One gram of the calcium salt, similar to that prepared according to the procedure of Example 5, is dissolved in 25 milliliters of $H_2O$ by adjusting with HCl to pH 1.5. The aqueous solution is adjusted to pH 3.0 and mixed with 15 milliliters of an aqueous solution saturated with NaCl. The precipitated free acid is washed freely with $H_2O$. The precipitate is dissolved in 50 milliliters of methanol, filtered and concentrated to approximately 10 milliliters. Forty milliliters of $H_2O$ is added to the methanol solution precipitating the free acid. The precipitate is washed with $H_2O$, followed by an acetone wash, removed by centrifugation and dried. Yield of the free acid is 340 milligrams. The chemical analysis of this product and its other chemical, physical and biological properties have already been described.

EXAMPLE 7

Preparation of the Picrate Salt

Ten grams of product prepared according to the procedure of Example 3 is dissolved in 250 milliliters of $H_2O$ at pH 2.0. An aqueous solution saturated with picric acid is added until no further precipitate forms. The precipitate is removed by centrifugation and washed with $H_2O$. The picrate is dissolved in 200 milliliters of acetone, concentrated under reduced pressure, to about 100 milliliters, and the picrate precipitated by the addition of $H_2O$ until precipitation is complete. The supernatant is decanted and the picrate dissolved in 200 milliliters of acetone. Butanol is added, and the solution concentrated under reduced pressure to approximately 100 milliliters of an anhydrous butanol solution. The butanol solution is mixed with three volumes of ether, the precipitated picrate removed by centrifugation, washed with ether and dried. The yield of picrate is 8.5 grams.

EXAMPLE 8

Preparation of the Sodium and Potassium Salts

One hundred grams of the calcium salt similar to that described in Example 4, is dissolved in 1 liter of $H_2O$ at pH 2.0 adjusted with HCl. The aqueous solution is adjusted to pH 3.3 and extracted 2 times with approximately 1 liter of butanol each time. The butanol extract after washing with $H_2O$ at pH 3.4, is dried over $Na_2SO_4$ and filtered.

A ⅓ portion, 777 milliliters, of the butanol solution is stirred with 200 milliliters of $H_2O$, adjusted with NaOH to pH 8.5 and concentrated to approximately 200 milliliters of an anhydrous butanol solution. A crystalline sodium salt which precipitates is removed by centrifugation, washed with butanol, ethanol, acetone and dried. The yield of crystalline sodium salt, is 3.0 grams. A second crop of sodium salt is collected by stirring the mother liquor with 10 volumes of acetone and removing the precipitate by centrifugation. The precipitate is washed with acetone and dried to yield 13.1 grams of material.

A potassium salt is prepared from a second ⅓ portion of the butanol solution by the same procedure except that KOH is used to adjust to pH 8.5.

Five hundred milligrams of the free acid of aspartocin is dissolved in 5 milliliters of ethanol. A saturated ethanolic solution of KOH is added dropwise to the ethanol solution of aspartocin until no further precipitate results. The precipitated potassium salt is removed by centrifugation, washed with 8 milliliters of ethanol and 10 milliliters of acetone. The salt is dried under vacuum to yield 220 milligrams.

The sodium salt is prepared as described above using the same concentration of free acid and adding a saturated ethanolic solution of NaOH to form the salt. The yield of dried sodium salt is 185 milligrams.

EXAMPLE 9

Production of Aspartocin by Streptomyces violaceus var. aspartocinicus

The conditions of inoculum preparation and fermentation are the same as previously described in Examples 1 and 2 of this application. The culture is fermented in two tanks using 100 liters of fermentation medium in each tank.

Tank 1

| Fermentation medium: | Grams per liter |
|---|---|
| Peptone | 25.0 |
| Corn starch | 10.0 |
| Molasses | 20.0 |
| Lactalbumin | 5.0 |
| $Mg_2SO_4.7H_2O$ | 5.0 |
| $CaCO_3$ | 1.0 |

Tank 2

| Fermentation medium: | Grams per liter |
|---|---|
| Soy bean meal | 40.0 |
| Corn starch | 10.0 |
| Molasses | 20.0 |
| $CaCO_3$ | 3.0 |

After 137 hours of fermentation, the tank mashes are harvested, pooled, and processed as follows:

Isolation and Purification of Aspartocin 190 grams of calcium chloride and 5700 grams of diatomaceous earth are added to 190 liters of fermented mash. The mixture is adjusted to pH 5.5, stirred for 20 minutes and filtered. The precipitated antibiotic is filtered off with the mash cake and the spent filtrate discarded. The mash cake is washed with 60 liters of water at pH 5.0–5.5 and filtered. The inactive water wash is discarded. The mash cake is extracted twice by stirring 20 minutes with 60 liters of water at pH 9.8–10.0. After filtration the alkaline water extracts are pooled, adjusted to pH 1.0–3.0 with HCl and extracted twice with ¼ volume of n-butanol. The 65 liters of pooled butanol extract are adjusted to pH 5.0–7.0 and concentrated under reduced pressure to approximately 4 liters of anhydrous butanol. The antibiotic precipitates and is removed by centrifugation and the butanol supernatant discarded. The precipitate is dissolved in approximately 500 milliliters of water at pH 1.5 and the solution is filtered. The aqueous solution is extracted 3 times with 300 milliliter portions of n-butanol. The butanol extract 950 milliliters, is adjusted to pH 5.0 to 5.5 and stirred with 50 milliliters of a wet butanol solution containing 3 grams of calcium chloride at a pH of 5.0–5.5. The precipitated calcium salt is removed by centrifugation, washed with wet butanol, washed again with acetone and dried. The yield of product is 7.2 grams.

This application is a continuation-in-part of our co-pending application Serial No. 773,957, filed November 14, 1958, now abandoned.

We claim:

1. A substance effective in inhibiting the growth of gram-positive bacteria having an isoelectric point of about pH 3.3, said substance being soluble in water, methanol, ethanol, butanol and glacial acetic acid, slightly soluble in acetone, ethyl acetate and ether, said substance containing the elements carbon, hydrogen, nitrogen, sulphur and oxygen in the following proportions by weight:

| | |
|---|---|
| Carbon | 53.58 |
| Hydrogen | 7.58 |
| Nitrogen | 13.58 |
| Sulphur | 0.36 |
| Oxygen | 24.90 | said substance having an optical rotation $[\alpha]_D^{25°} = +26.4°$ (c., 2.1% solution in methanol), said substance containing the following components: L-aspartic acid, L-proline, L-valine, glycine, D-α-pipecolic acid, α[L]-β-methylaspartic acid and α,β-diaminobutyric acid, the first four components being in the molar ratio of 4:1:1:2, respectively, and said substance when suspended in a potassium bromide pellet exhibits characteristic absorption in the infrared region of the spectrum at the following wavelengths expressed in microns: 3.07, 3.45, 6.03, 6.35, 6.89, 7.15, 8.10 and 9.82, and which is produced by cultivating a microorganism selected from the group consisting of *Streptomyces griseus* var. *spiralis* and *Streptomyces violaceus* var. *aspartocinicus* in an aqueous nutrient medium containing assimilable sources of carbohydrate nitrogen, and inorganic salts under submerged aerobic conditions until substantial antibacterial activity is imparted to said medium, and then recovering the so-produced substance from the medium.

2. A salt of said substance as defined in claim 1.

3. A process for the production of aspartocin which comprises cultivating a microorganism selected from the group consisting of *Streptomyces griseus* var. *spiralis* and *Streptomyces violaceus* var. *aspartocinicus* in an aqueous nutrient medium containing assimilable sources of carbohydrate, nitrogen and inorganic salts under submerged aerobic conditions until substantial antibacterial activity is imparted to said medium.

4. A process for the production of aspartocin which comprises cultivating *Streptomyces violaceus* var. *aspartocinicus* in an aqueous nutrient medium containing assimilable sources of carbohydrate, nitrogen and inorganic salts under submerged aerobic conditions for a period of from 24 to 240 hours and at a temperature of from 20 to 35° C., and recovering the antibiotic so-produced from the fermentation broth.

5. A process for the production of aspartocin which comprises cultivating *Streptomyces griseus* var. *spiralis* in an aqueous nutrient medium containing assimilable sources of carbohydrate, nitrogen and inorganic salts under submerged aerobic conditions for a period of from 24 to 240 hours and at a temperature of from 20 to 35° C., and recovering the antibiotic so-produced from the fermentation broth.

6. A process as in claim 5 in which the antibiotic is recovered from the fermentation broth by filtering the broth, extracting the antibiotic activity from the filter cake with water, back-extracting the antibiotic activity into an immiscible solvent, and separating the antibiotic activity therefrom.

7. A process as in claim 6 in which a calcium salt is added to the fermentation broth so that aspartocin calcium salt is produced.

References Cited in the file of this patent

Pridham et al.: Applied Microbiology, vol. 6, pages 52–79, 1958.